Figure 1:
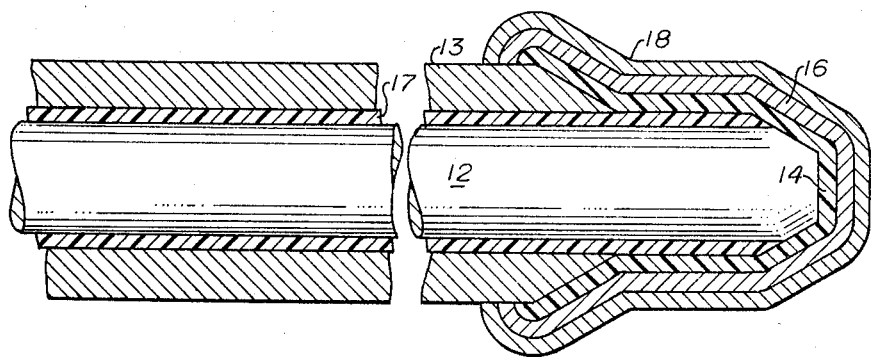

Nov. 22, 1966     D. R. HENLEY     3,287,518
SENSOR FOR DETECTING TRANSIENT SHOCK PHENOMENA
Filed Oct. 8, 1964

INVENTOR.
DARWIN R. HENLEY
BY
ATTORNEY

3,287,518
SENSOR FOR DETECTING TRANSIENT SHOCK PHENOMENA

Darwin R. Henley, Newark, Calif., assignor to the United States of America as represented by the United States Atomic Energy Commission
Filed Oct. 8, 1964, Ser. No. 402,663
8 Claims. (Cl. 200—61.08)

This invention was evolved in the course of, or under, Contract W-7405-ENG-48 with the United States Atomic Energy Commission.

The present invention relates to sensors for detecting the occurrence of rapid transient motion. More particularly it relates to a sensor for detecting transient shock waves utilizing vapor deposited dielectric material in the fabrication of the sensitive element.

In order to study rapid transient motion, such as shock phenomena propagating away from an explosion, it is necessary to be able to accurately determine the position-time history of such motion. Such position-time history often is obtained by using electrical switching devices, called "impact switches," which close under the impact of shock waves or mechanical impacts by what is often termed the "pin technique." It is apparent from the nature of the phenomena under observation, that is shock phenomena, that these devices must have a fast predictable response. Defining response time as the duration between arrival of a shock phenomena at the switch device, and 90% of full electrical conduction ability of the switch, a fast response would be one whose duration is in the order of the time required for the shock occurrence to traverse the distance between the poles of the switching device. A predictable switching device would be one wherein the standard deviation from the mean response time is less than approximately one-fourth the value of the response time.

Coaxially arranged impact switches, in general, have heretofore been found to work well in the above-mentioned shock detection applications. The present invention is preferably such a coaxial device. These coaxial devices generally comprise an outer conducting cylindrical shell having a conducting end cap and an insulated inner conductor having its end retracted a short distance from the end cap. The impact of a shock wave impinging on this end cap forces the cap against the inner conductor thereby electrically shorting the inner and outer conductors together. This shorting event is detected easily with appropriate conventional electronic circuitry.

These coaxial impact switches become unreliable and ineffective when used to detect shock waves having low pressure amplitudes, for example, pressures less than 10 kilobars. At these low pressures, the impact switches of the prior art exhibit intolerably slow rise times and poor reproducibility. Also the relatively large size of these prior art impact switches do not allow optimum use since too few units can be installed per unit area. Also, the response of these devices is found to be loading rate dependent. That is, their response is affected to a great degree by the velocity of the measured shock phenomena. This effect is attributed to the relatively large spacing between the conductors to be shorted and the lack of a method to obtain close tolerances on this spacing. In contrast, the impact switch of the present invention preferably has an outer diameter in the neighborhood of 0.016 inch with a spacing between inner and outer conductors of approximately 0.00015 inch.

The present invention makes it possible to overcome those above-mentioned deficiencies of the prior art coaxial impact switches without sacrificing the existing meritorious attributes of those switches. This is accomplished by uniquely utilizing a vapor plating technique (a technique which in itself is also new and will be set forth in detail infra) to deposit a thin layer of dielectric material over the ends of the above-mentioned inner and outer conductors, and then vapor depositing a suitable electrically conducting material over this dielectric layer to form an end cap in electrical contact with the outer conductor. With the thin (e.g., 1000 angstroms thick) closely controllable (e.g., within 50 angstroms) dielectric layers which are deposited with the new vapor plating technique on the extremely small surface area (e.g., 0.16 inch) of the end of this impact switch, it is now feasible to reproduceably build a heretofore unavailable small, fast response, reliable impact switch of predictable performance for operation in low pressure as well as high pressure regions.

Accordingly, it is a major object of the present invention to provide an impact switch which responds rapidly to a wide amplitude range of shock phenomena.

A more specific object of this invention is to provide an impact switch having a response time of the order of 2 to 10 nanoseconds when subjected to the impact of shock waves ranging in magnitudes from near zero to 360 kilobars pressure.

Another object of the present invention is to provide an impact switch smaller than heretofore attainable thus permitting shock phenomena detection set-ups employing more sensor devices per unit area than hitherto available.

A further object is to provide a highly reproducible response time impact switch in which the mean deviation of the response times from an average response will be substantially lower than those representing the average response.

Additionally, an object of this invention is to provide loading rate independence in an impact switch, i.e., to provide an impact switch whose response it not materially affected by the propagation velocity of the transient motion which activates the switch.

Still another object of this invention is to provide a corrosion resistance shock wave sensor.

It is an additional object of this invention to provide a technique for fabricating an impact switch which is highly reliable.

Figure 2:
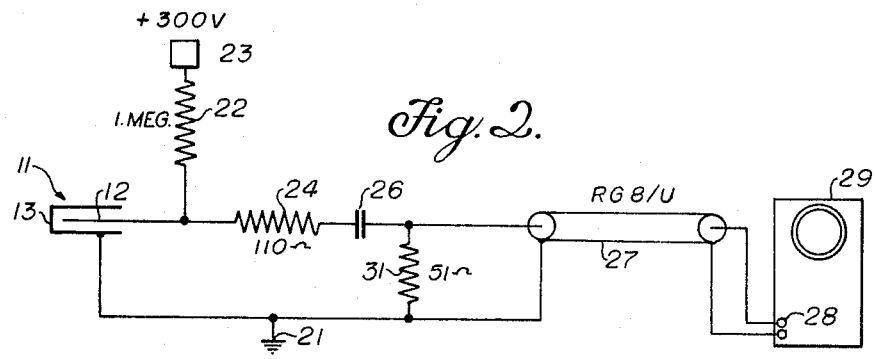

Other objects and advantageous features of the invention will become apparent by consideration of the following description and accompanying drawing of which:

FIGURE 1 presents a cross sectional view of one coaxial embodiment of the impact switch, and FIGURE 2 schematically depicts suitable electronic circuitry capable of detecting closure of an impact switch.

To attain these objects, the present invention employs a thin vapor deposited dielectric in turn covered with a vapor deposited conductor. The thin close tolerance dielectric layer permits fast reproducible response times while the ability to deposit the dielectric on small defined areas permits fabrication of a relatively small unit. More specifically, as shown in FIGURE 1, impact switch 11 comprises an elongated electrically conducting wire 12 disposed coaxially within and insulatingly apart from an elongated cylindrical shell 13. One end of wire 12, bared of insulation, is generally but not necessarily rounded, and generally but not necessarily extends beyond the corresponding end of shell 13. Vapor deposited dielectric film 14 covers the rounded end portions of wire 12 and shell 13 and this film 14 is in turn covered by an electrically conducting vapor deposited, low melting point metal foil 16 which makes electrical contact with shell 13. Foil 16 usually has a thickness of approximately .002 inch. Foil 16 should be of a material whose vaporization temperature is sufficiently low that it does not damage dielectric film 14 during the deposition process. This also will be explained in full at a later point.

In practice, wire 12 is, for example, 0.010 inch diameter steel piano wire coated with suitable adherent insulation film, e.g., "Formvar" insulation 17, "Formvar" being a polyvinyl formal resin manufactured by Shawnigan Products Corporation. For shell 13, a thin walled hypodermic tubing of 0.016 to 0.022 inch outside diameter has been used successfully. "Mylar" is generally used for film 14. It has been found that other dielectric materials such as polyethylene, polystyrene, nylon, etc., do not fully harden after vapor deposition and tend to be easily smeared and destructively deformed if care is not taken during fabrication. "Mylar" is a polyethylene terephthalate resin manufactured by E. I. du Pont de Nemours & Company.

In order to prevent relative motion between wire 12 and shell 13, a dielectric filler is generally inserted in any void areas between these two elements.

As stated above, the material comprising foil 16 preferably must have a deposition temperature below the decomposition point of the vapor deposited dielectric lest the heat from that material destroy the integrity of the dielectric film. It has been found that indium metal serves well as foil 16 when deposited on Mylar. Other suitable low melting point materials would be Wood's metal, and the lead-tin solders. However, indium, which melts at 130° F., is preferred since it is pure and does not emit gases when heated and hence does not raise the chamber pressure which must be maintained at a low level in the vapor deposition process described infra.

A second metal foil 18 often is vapor deposited or electro-formed on top of foil 16 to provide additional corrosion and abrasion resistance. Gold is used extensively for foil 18, but copper, aluminum and silver have been used. It has been found experimentally that these additional metals cannot with consistent success be vapor plated directly on the mylar without the intermediate indium foil 16 since, for reasons mentioned above, the deposition heat of these vaporized metals would damage the dielectric film 14.

In operation, the impact of some rapid transient motion, such as a shock wave propagating from an explosive, serves to drive conducting foil 16 through dielectric film 14 into conducting wire 12 thereby establishing an electrical short circuit between wire 12 and shell 13. Appropriate conventional continuity testing or instrument circuitry may be used to detect this short circuit.

FIGURE 2 depicts one such suitable short circuit detecting circuit appropriate for use with the impact switch of the present invention. In the FIGURE 2, shell 13 of impact switch 11 connects to ground point 21 while wire 12 connects through a one megohm resistor 22 to a 300 volt power source 23. Wire 12 also is connected through a 110 ohm resistor 24, a 400 picofarad capacitor 26, and ten feet of RG 8/U coaxial 27, serially in that order, to the input terminal 28 of a cathode ray oscilloscope 29. The oscilloscope is referenced to ground point 21 through the outer conductor of cable 27.

In operation, source 23 charges capacitor 26 through resistors 22 and 24 to the 300 volt level. Resistor 31 serves to reference terminal 28 to ground when no signal is applied. When a shock wave electrically closes impact switch 11, as described in conjunction with FIGURE 1, capacitor 26 begins to discharge through the electrical loop comprised of resistors 24 and 31. This discharge of current from capacitor 26 immediately establishes a voltage across resistor 31, which voltage is monitored by oscilloscope 29. This monitored signal appearing at the oscilloscope 29 serves as a time record of the presence of a shock wave at the face of impact switch 11. Cable 27 in combination with resistor 31 serves to eliminate reflected signals which may detract from the significance of the true data signal.

TECHNIQUE FOR VAPOR PLATING MYLAR

Standard evaporation deposition apparatus is used for this vapor plating process (bell jar, vacuum pump, etc.). About 35 pieces of Mylar (9/16 x 9/16 x .008 inch) are placed in a molybdenum boat which is located in a vacuum chamber and is connected to appropriate controllable heating elements. The inner and outer conductors of the impact switch are mounted in a rotatable jig about 6½ inches from the boat in a plane 30° from horizontal. A mask covers all areas on this inner-outer conductor combination except those areas to be plated with Mylar.

The chamber pressure is reduced to approximately $2 \times 10^{-4}$ mm. and the Mylar is heated to produce slow vaporization. Too high a temperature will cause impurities in the Mylar to escape thus detrimentally raising the chamber pressure. When this reduction in pressure is observed, the heat is simply cut back. Excessive heating of the Mylar also can be detected by visually observing bubbling in the melted Mylar. The inner-outer conductor combination is rotated during this operation to obtain an even dielectric film on the unmasked portion of impact switch.

It has been found that a layer of Mylar approximately .0002 inch thick will be deposited in about 90 minutes; a film approximately 1000 angstroms thickness is deposited in approximately 30 minutes. The thinner films provide better results at the low shock pressures than do the thicker films. Indium alone or with subsequent depositions of other metals indicated above are then vapor deposited by known methods over the Mylar.

Although the above description is couched in terms of specific embodiments of the present invention, it should be understood that the invention is to be construed liberally and that various changes and modifications may be made without departing from the spirit and scope of the invention as defined in the appended claims. For example, two parallel metal strips could have been used with the dielectric plated across the ends of these strips. Also the outer or inner conductors of this impact switch could have a square cross section rather than the circular cross section shown in the drawing. It is possible to form the outer shell of the impact switch from a non-conducting material, an electrically conducting lead then being used to run directly from the conducting foil to the associated electronic circuitry. Or the outer shell could be eliminated altogether; in this case electric terminals could be connected directly to the conducting foil and to the electrically conducting base material on which the dielectric was deposited. By keeping in mind that the crux of the invention lies in the use of the vapor deposited material to obtain reliable reproducible operation, especially at lower pressures and to obtain a more compact impact switch, these and other modifications will be obvious to one skilled in the art.

What is claimed is:
1. A sensor apparatus for detecting rapid shocks incident thereon, comprising
 (a) a generally cylindrical, electrically conducting wire having a first end,
 (b) a uniform vapor-deposited film of dielectric material disposed on the surface defined by said first end of said wire, said film of dielectric being capable to withstand a high voltage gradient thereacross and being subject to failure upon impact of a shock thereon,
 (c) a uniform foil of electrically conducting material disposed upon the face of said film distal said first end of said wire, and
 (d) at least two terminal means connected to said wire and said foil respectively, said terminal means being adapted to be connected to electronic short circuit detecting equipment, whereby the impact time of a shock upon said sensor producing failure of said film may be determined.

2. A sensor apparatus as defined in claim 1, further defined in that said sensor apparatus includes a cylindrical shell of an electrically conducting material disposed coaxially and substantially coterminous with said wire in electrically insulated relation thereto, said cylindrical shell being in direct electrical contact with said conducting foil.

3. A sensor as recited in claim 2 wherein said shell is an elongated slender thin-walled cylindrical shell, and wherein said wire is an elongated slender conducting wire generally coextensive with said shell.

4. A sensor as recited in claim 1 further defined by said vapor plated conducting material having a melting point temperature below about the melting temperature point of said vapor plated dielectric material.

5. In a sensor device for detecting the impact of a shock wave, the combination comprising:
   (a) an elongated slender electrically-conducting cylindrical shell,
   (b) an elongated slender electrically conducting wire disposed insulatingly apart and coaxially within said shell, a first end of said wire being substantially coterminous with a first end of said shell, the outer surface of said wire and the inner surface of said shell defining an insulation region,
   (c) insulation means disposed to occupy a substantial portion of said defined insulation region,
   (d) a single uniform film of vapor deposited dielectric material disposed on the surface defined by the first ends of said wire and said shell said film of dielectric being capable of withstanding a high voltage gradient thereacross and being subject to disruption upon impact of said shock wave,
   (e) a uniform thickness foil of vapor deposited electrically conducting material in intimate contact with the outer surface defined by the face of said dielectric film in electrical contact with said conducting shell, and
   (f) for connecting short circuit detecting electronic equipment to said wire and to said shell to detect the said disruption of said film and interconnections of the wire and shell.

6. The invention of claim 5 wherein an additional electroformed electrically conducting metal sheet is in intimate protective contact with the exposed surface of said foil of electrically conducting material.

7. The invention of claim 5 wherein an additional vapor deposited electrically conducting metal sheet is in intimate protective contact with the exposed surface of said foil of electrically conducting material.

8. In an impact switch for detecting rapid transient shock waves, the combination comprising:
   (a) a circularly-cylindrical electrically conducting metal wire, the diameter of said wire approximatly 0.010 inch,
   (b) insulation means disposed to surround the external cylindrical surface of said wire,
   (c) a circularly-cylindrical electrically conducting elongated metal shell, the outer diameter of said shell approximately 0.022 inch, said shell disposed coaxially about said wire and said insulation means, a first end of said wire extending beyond a first end of said shell by a distance of approximately 0.010 inch,
   (d) a single uniform vapor deposited film of polyethylene terephthalate resin disposed on the surface defined by the first end of said shell and the first end of said wire, said film having a thickness of approximately 0.0002 inch and adapted to rupture upon impact of a shock wave,
   (e) a single uniform foil of vapor deposited Indium vapor deposited at least on the surface defined by the face of said film distal said first ends of said shell and said wire and on the portion of the surface of said shell immediately adjacent the boundary of said film, said foil having a thickness of approximately .022 inch, and
   (f) electrical terminal means connected to the second ends of said wire and said shell.

References Cited by the Examiner

UNITED STATES PATENTS

| 1,784,656 | 12/1930 | Butler | 200—118 |
| 2,118,437 | 5/1938 | Kayatt | 200—118 |
| 3,114,868 | 12/1963 | Feldman | 317—261 X |

OTHER REFERENCES

Jones et al., "Thin Film Electronic Circuits," IBM Technical Disclosure Bulletin, March, 1961, vol. 3, No. 10 (p. 101).

BERNARD A. GILHEANY, *Primary Examiner.*

H. A. LEWITTER, *Assistant Examiner.*